US012694808B2

(12) United States Patent 　(10) Patent No.:　US 12,694,808 B2
Osachi et al. 　(45) Date of Patent:　Jul. 28, 2026

(54) PROJECTION DISPLAY DEVICE

(71) Applicant: SEIKO EPSON CORPORATION, Tokyo (JP)

(72) Inventors: Yuki Osachi, Matsumoto (JP); Kazuhisa Mizusako, Shiojiri (JP); Toru Aoki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/041,062

(22) Filed: Jan. 30, 2025

(65) Prior Publication Data

US 2025/0246106 A1 　Jul. 31, 2025

(30) Foreign Application Priority Data

Jan. 31, 2024　(JP) ................................. 2024-012620

(51) Int. Cl.
　*G09G 3/00*　(2006.01)
　*G09G 3/36*　(2006.01)
　*H04N 9/31*　(2006.01)
(52) U.S. Cl.
　CPC ............. *G09G 3/007* (2013.01); *G09G 3/002* (2013.01); *G09G 3/3607* (2013.01); *H04N 9/3188* (2013.01); *G09G 2320/043* (2013.01)
(58) Field of Classification Search
　None
　See application file for complete search history.

(56) References Cited

U.S. PATENT DOCUMENTS

| 6,657,603 | B1 * | 12/2003 | Demetrescu | ........... | G09G 3/007 |
| | | | | | 348/625 |
| 12,333,971 | B1 * | 6/2025 | Adema | ..................... | G09G 3/32 |
| 2002/0008812 | A1 * | 1/2002 | Conner | ................ | H04N 9/3188 |
| | | | | | 348/E9.027 |
| 2013/0300948 | A1 * | 11/2013 | Jannard | ................ | H04N 9/3164 |
| | | | | | 348/756 |
| 2019/0066553 | A1 | 2/2019 | Ohkoba | | |
| 2020/0145627 | A1 * | 5/2020 | Hosaka | ................ | H04N 9/3105 |

FOREIGN PATENT DOCUMENTS

JP　　　　2019-039995　A　　　3/2019

* cited by examiner

*Primary Examiner* — Matthew Yeung

(74) *Attorney, Agent, or Firm* — Oliff PLC

(57) ABSTRACT

A projection display device including a liquid crystal panel including a panel pixel, an optical path shifting element that shifts a projection position of a projection pixel projected every four unit period for example, and a display control circuit that controls the liquid crystal panel and the optical path shifting element are provided. The display control circuit supplies a data signal corresponding to a gradation level designated by video pixel data in video data to the panel pixel for each of the unit periods, controls the projection position for each of the unit periods for the optical path shifting element, and the optical path shifting element causes shifting to a target projection position that is a target in response to passage of the target projection position, for each unit period.

5 Claims, 10 Drawing Sheets

<OPTICAL PATH SHIFT TRAJECTORY (SECOND EMBODIMENT)>

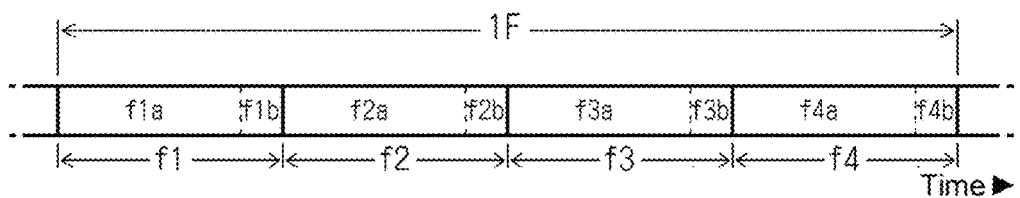
FIG. 7
<VIDEO PIXEL ARRANGEMENT>
| B11 | B11 | B12 | C12 | B13 | C13 |
|-----|-----|-----|-----|-----|-----|
| A11 | D11 | A12 | D12 | A13 | D13 |
| B21 | C21 | B22 | C22 | B23 | C23 |
| A21 | D21 | A22 | D22 | A23 | D23 |
<PANEL PIXEL ARRANGEMENT>
| p11 | p12 | p13 |
|-----|-----|-----|
| p21 | p22 | p23 |
FIG. 8
<OPTICAL PATH SHIFT TRAJECTORY (FIRST EMBODIMENT)>
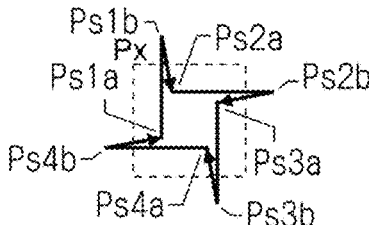
FIG. 9
<OPTICAL PATH SHIFT TRAJECTORY (COMPARATIVE EXAMPLE)>
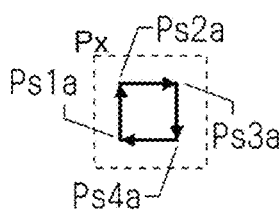
FIG. 10

<VIDEO PIXEL ARRANGEMENT>

| B11 | C11 | B12 | C12 | B13 | C13 |
| A11 | D11 | A12 | D12 | A13 | D13 |
| B21 | C21 | B22 | C22 | B23 | C23 |
| A21 | D21 | A22 | D22 | A23 | D23 |

FIG. 13

<OPTICAL PATH SHIFT TRAJECTORY (SECOND EMBODIMENT)>

<OPTICAL PATH SHIFT TRAJECTORY (THIRD EMBODIMENT)>

PROJECTION DISPLAY DEVICE

The present application is based on, and claims priority from JP Application Serial Number 2024-012620, filed Jan. 31, 2024, the disclosure of which is hereby incorporated by reference herein in its entirety.

BACKGROUND

1. Technical Field

The present disclosure relates to a projection display device.

2. Related Art

According to a known technique for a liquid crystal projector using a liquid crystal panel, a projection position of a panel pixel projected on a screen or the like is shifted by an optical path shifting element for achieving pseudo increase in resolution (see, for example, Japanese Patent Application Laid-Open No. 2019-39995). Specifically, with the technique, one frame period is divided into a plurality of unit periods, and the projection position is shifted so as to be different for each of unit periods. With this technique, the user can perceive as if more pixels than the number of panel pixels of the liquid crystal panel are being projected.

Recent liquid crystal panels have been increasingly downsized and have higher definition with a gap between pixel electrodes reduced. As a result, an electric field generated between adjacent pixel electrodes causes alignment defect of the liquid crystal which is visually recognized as display defect.

When the projection position is shifted by the optical path shifting element, such display defect due to the alignment defect is visually recognized as being extended in the shift direction. This leads to a problem of eminent deterioration of display quality.

SUMMARY

In order to solve the problem described above, a projection display device according to an aspect of the present disclosure includes a liquid crystal panel including a panel pixel, an optical path shifting element configured to shift an optical path of projection light projected from the panel pixel to make a projection position of a projected pixel displayed by the projection light different for each of k unit periods from a first unit period to a kth unit period included in one frame period, k being an integer that is equal to or larger than two, and a display control circuit configured to control the liquid crystal panel and the optical path shifting element, wherein the display control circuit supplies a data signal corresponding to a gradation level designated by video pixel data forming video data, to the panel pixel in each of the unit periods, and controls, by the optical path shifting element, the projection position for each of the unit periods, and the optical path shifting element shifts, for each of the unit periods, the projection light to a target projection position which is a target, after the projection light passes through the target projection position.

BRIEF DESCRIPTION OF THE DRAWINGS

FIG. 7 is a diagram illustrating a relationship between one frame period and a unit period in the projection display device.

FIG. 8 is a diagram illustrating a video pixel represented by one panel pixel in one frame period.

FIG. 9 is a diagram illustrating a trajectory of a projection position obtained by an optical path shifting element according to a first embodiment.

FIG. 10 is a diagram illustrating a trajectory of a projection position obtained by an optical path shifting element according to Comparative Example.

FIG. 13 is a diagram illustrating an example of an arrangement of video pixels.

DESCRIPTION OF EMBODIMENTS

Hereinafter, a projection display device according to an embodiment will be described with reference to the drawings. In each drawing, dimensions and scales of each portion are appropriately different from actual ones. Further, since embodiments to be described below are preferred specific examples, various technically preferable limitations are applied, but the scope of the present disclosure is not limited to these embodiments unless it is otherwise stated in the following description that the present disclosure is limited.

Figure 1:
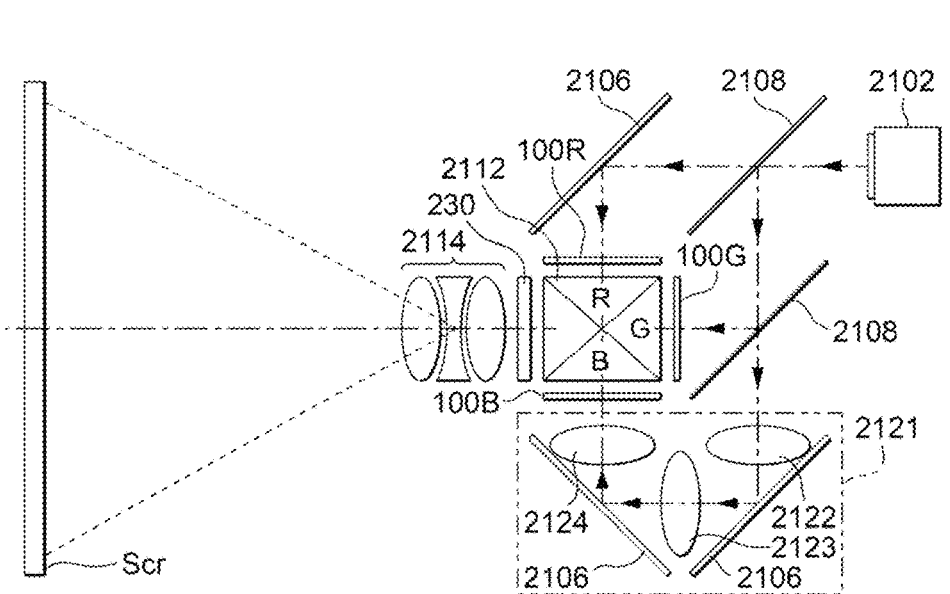
FIG. 1 is a diagram illustrating a projection display device according to a first embodiment.

FIG. 1 is a diagram illustrating an optical configuration of a projection display device 1 according to an embodiment. As illustrated in the figure, the projection display device 1 includes liquid crystal panels 100R, 100G, and 100B. The projection display device 1 contains a light source unit 2102 including a white light source such as a laser. Projection light emitted from this light source unit 2102 is separated into three primary colors of red (R), green (G), and blue (B) by three mirrors 2106 and two dichroic mirrors 2108 disposed inside. Of these, the R light is incident on the liquid crystal panel 100R, the G light is incident on the liquid crystal panel 100G, and the B light is incident on the liquid crystal panel 100B.

Since an optical path of B is longer than optical paths of R and G, it is necessary to prevent loss in the optical path of B. To this end, a relay lens system 2121 including an entrance lens 2122, a relay lens 2123, and an emission lens 2124 is provided in the optical path of B.

The liquid crystal panel 100R includes a plurality of pixel circuits, as will be described below. Each of the plurality of pixel circuits includes a liquid crystal element. The liquid crystal element of the liquid crystal panel 100R is driven based on a data signal corresponding to R, to have a transmittance corresponding to the voltage of the data signal.

To this end, the transmittance of the liquid crystal elements is individually controlled based on the data signal corresponding to R so that a transmitted image of R is generated in the liquid crystal panel 100R. Similarly, in the liquid crystal panel 100G, a transmitted image of G is generated based on a data signal corresponding to G, and in the liquid crystal panel 100B, a transmitted image of B is generated based on a data signal corresponding to B.

The transmitted images of respective colors generated by the liquid crystal panels 100R, 100G, and 100B are incident on the dichroic prism 2112 from three directions. In the dichroic prism 2112, the R and B light are refracted at 90 degrees, while the G light travels straight. The dichroic prism 2112 therefore combines the images of the respective colors. The composite image generated by the dichroic prism 2112 is incident on a projection lens 2114 through an optical path shifting element 230.

The projection lens 2114 enlarges and projects the composite image via the optical path shifting element 230 onto a screen Scr that is a projection surface.

The optical path shifting element 230 shifts an optical path of light (projection light) emitted from the dichroic prism 2112. More specifically, the optical path shifting element 230 shifts position of the composite image projected, in the left-right direction and/or in the up-down direction with respect to a projection surface.

The transmitted images obtained by the liquid crystal panels 100R and 100B are projected after being reflected by the dichroic prism 2112, whereas the transmitted image obtained by the liquid crystal panel 100G is projected in a straight line. Thus, the transmitted images respectively from the liquid crystal panels 100R and 100B are laterally inverted with respect to the transmitted image from the liquid crystal panel 100G.

Figure 2:
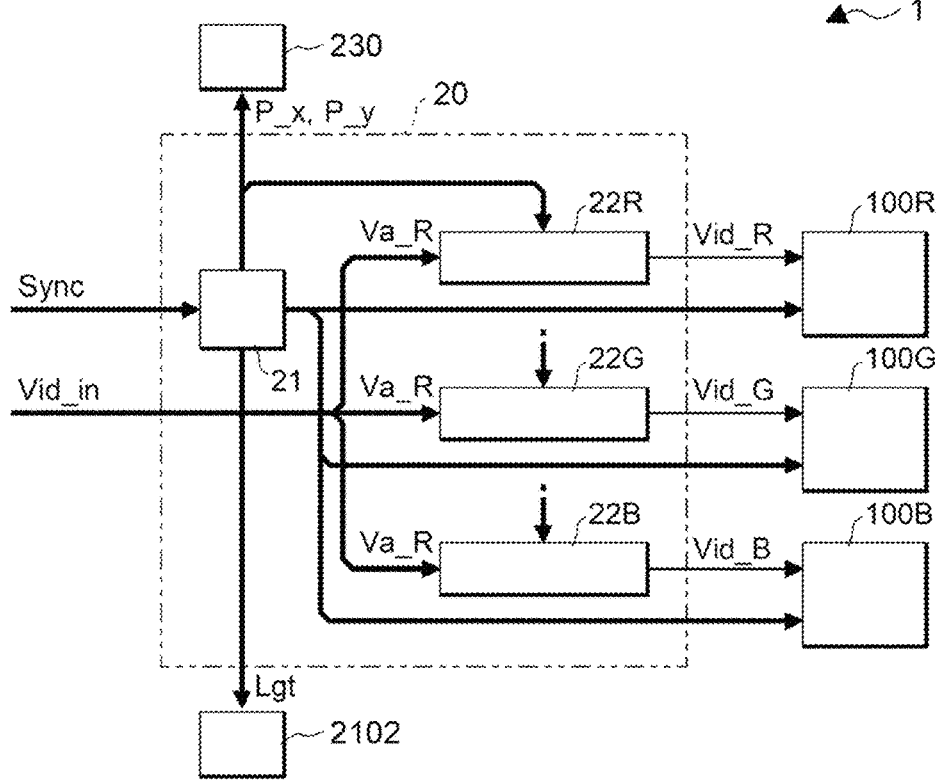
FIG. 2 is a block diagram illustrating a configuration of the projection display device.

FIG. 2 is a block diagram illustrating an electrical configuration of the projection display device 1. As illustrated in the figure, the projection display device 1 includes a display control circuit 20, the liquid crystal panels 100R, 100G, and 100B, the optical path shifting element 230, and the light source unit 2102.

Video data Vid_in is supplied from an upper device such as a host device (not illustrated) in synchronization with a synchronization signal Sync. The video data Vid_in designates a gradation level of pixels constituting one frame period of a video, for example, in 8 bits for each RGB.

The pixel of the image designated by the video data Vid_in is referred to as a video pixel, and data for designating the gradation level of the video pixel is referred to as video pixel data, but the video pixels and the video pixel data may not be particularly distinguished from each other in the description. Further, a pixel of an image before or after the combination in the liquid crystal panel 100R, 100G, or 100B is referred to as a panel pixel. A panel pixel shifted by the optical path shifting element 230 and projected onto the screen Scr is referred to as a projection pixel, and the position where the panel pixel is projected is referred to as a projection position.

In the liquid crystal panels 100R, 100G, and 100B, panel pixels are arranged in a matrix in plan view. In the embodiment, an arrangement of the video pixels designated by the video data Vid_in is, for example, twice as large in a vertical direction and twice as large in a horizontal direction as an arrangement of the panel pixels from the liquid crystal panel 100R, 100G, or 100B.

In the embodiment, a color image projected onto the screen Scr is represented by combining the transmitted images of the liquid crystal panels 100R, 100G, and 100B. Thus, the minimum unit of the color image can be classified into a red sub-pixel corresponding to the liquid crystal panel 100R, a green sub-pixel corresponding to the liquid crystal panel 100G, and a blue sub-pixel corresponding to the liquid crystal panel 100B. However, in a case such as that there is no need to specify the colors of the sub-pixels in the liquid crystal panels 100R, 100G, and 100B, or, for example, when the brightness is simply the problem, there is no need to use the term sub-pixel in the first place. Therefore, in the description herein, the panel pixel is also referred to as a unit of displaying by the liquid crystal panels 100R, 100G, and 100B.

The synchronization signal Sync includes a vertical synchronization signal for instructing the start of vertical scanning of the video data Vid_in, a horizontal synchronization signal for instructing the start of horizontal scanning, and a clock signal indicating a timing for one video pixel in the video data Vid_in.

The display control circuit 20 includes a processing circuit 21, and conversion circuits 22R, 22G, and 22B.

Based on the synchronization signal Sync, the processing circuit 21 controls the conversion circuits 22R, 22G, and 22G, the liquid crystal panels 100R, 100G, and 100B, the optical path shifting element 230, and the light source unit 2102 for each of unit periods f1 to f4 described below.

The optical path shifting element 230 shifts the projection position in accordance with control signals P_x and P_y output from the processing circuit 21.

The light source unit 2102 changes the intensity of the emitted light in accordance with a control signal Lgt output from the processing circuit 21.

The video data Vid_in supplied from the upper device includes the R component referred to as video data Va_R, the G component referred to as video data Va_G, and the B component referred to as video data Va_B. The conversion circuit 22R temporarily stores the video data Va_R supplied from the upper device for one or more frame periods in an internal buffer, reads video data corresponding to the unit period, converts the video data into an analog voltage data signal Vid_R, and supplies the data signal to the liquid crystal panel 100R. The conversion circuits 22G and 22B are different from the conversion circuit 22R only in the color component of the video data that is a target of the conversion, and is the same as the conversion circuit 22R in other respects. Specifically, the conversion circuit 22G converts the video data Va_G corresponding to the unit period into an analog voltage data signal Vid_G and supplies the signal to the liquid crystal panel 100G, and the conversion circuit 22B converts the video data Va_B corresponding to the unit period into an analog voltage data signal Vid_G and supplies the signal to the liquid crystal panel 100B.

Next, the liquid crystal panels 100R, 100G, and 100B will be described. The liquid crystal panels 100R, 100G, and 100B are structurally the same, with only color, that is, wavelength, of incident light being different. Therefore, the liquid crystal panels 100R, 100G, and 100B will be generally described as a liquid crystal panel 100 without specifying the color.

Figure 3:
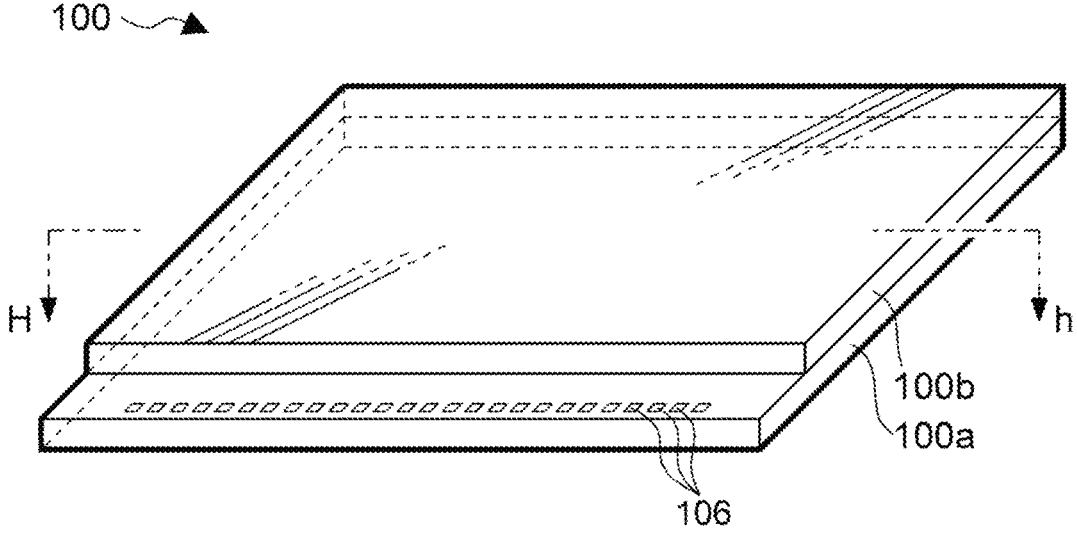
FIG. 3 is a perspective view illustrating a configuration of a liquid crystal panel of the projection display device.
Figure 4:
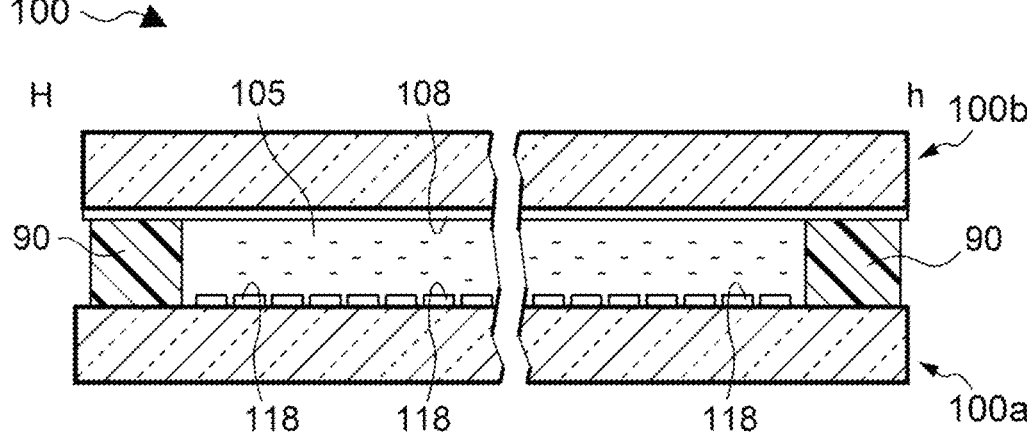
FIG. 4 is a cross-sectional view illustrating a structure of the liquid crystal panel.

FIG. 3 is a perspective view of the liquid crystal panel 100, and FIG. 4 is a cross-sectional view taken along line H-h in FIG. 3.

As illustrated in these figures, in the liquid crystal panel 100, an element substrate 100a on which pixel electrodes 118 are provided and a counter substrate 100b on which a common electrode 108 is provided are bonded together by a seal material 90 so that electrode formation surfaces face each other while maintaining a certain gap, and this gap is sealed with a liquid crystal 105.

As the element substrate 100a and the counter substrate 100b, a light-transmitting substrate such as glass or quartz may be used. As illustrated in FIG. 3, one side of the element substrate 100a protrudes from the counter substrate 100b. In this protruding region, a plurality of terminals 106 are provided along a horizontal direction in the figure. One end of a flexible printed circuit (FPC) substrate (not illustrated) is coupled to the plurality of terminals 106. The other end of the FPC substrate is coupled to the display control circuit 20, and the above-described various signals are supplied.

On the surface of the element substrate 100a facing the counter substrate 100b, the pixel electrodes 118 are formed by patterning a transparent conductive layer such as indium tin oxide (ITO), for example.

Further, although not elaborated in the figure, a microlens is provided for each panel pixel on the counter substrate 100b (or the element substrate 100a) in order to efficiently send a large amount of light to an opening that becomes the panel pixel. With this configuration, light repelled by a light shielding portion is sent to an opening of the microlens, improving the efficiency of light utilization.

Figure 5:
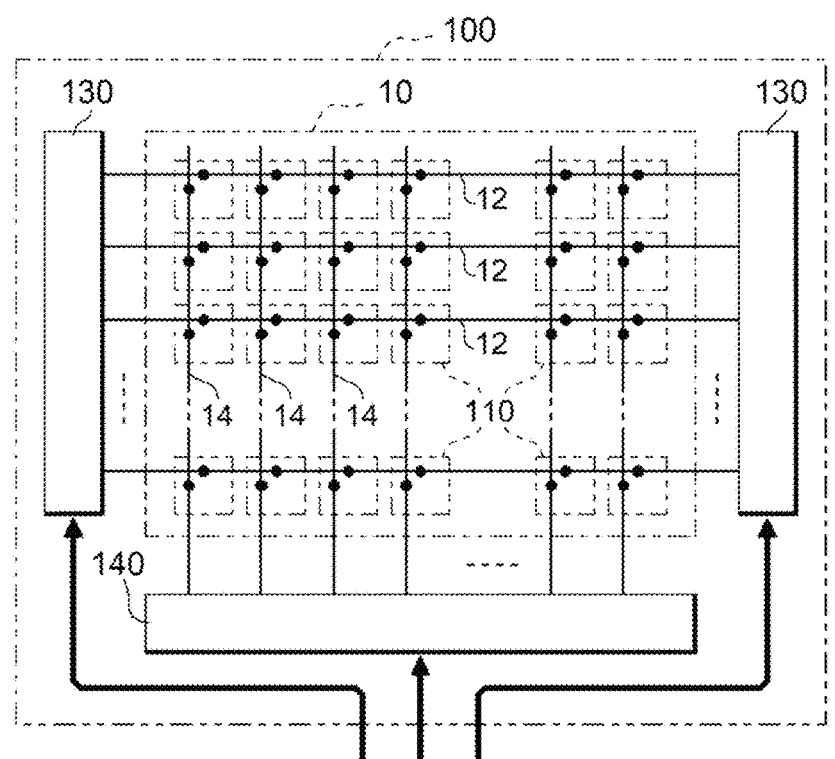
FIG. 5 is a block diagram illustrating an electrical configuration of the liquid crystal panel.

FIG. 5 is a block diagram illustrating an electrical configuration of the liquid crystal panel 100. The liquid crystal panel 100 is provided with a scanning line driving circuit 130 and a data line driving circuit 140 on a periphery of a display area 10.

In the display area 10 of the liquid crystal panel 100, pixel circuits 110 are arranged in a matrix. In detail, in the display area 10, a plurality of scanning lines 12 are provided to extend in the horizontal direction in the figure, and a plurality of data lines 14 are provided to extend in the vertical direction and to be electrically insulated from the scanning lines 12. The pixel circuits 110 are provided in a matrix to correspond to intersections between the plurality of scanning lines 12 and the plurality of data lines 14.

Assuming that the number of scanning lines 12 is m and the number of data lines 14 is n, the pixel circuits 110 are arranged in a matrix of m vertical rows and n horizontal columns. Both m and n are integers equal to or larger than 2. In the scanning lines 12 and the pixel circuits 110, the rows of the matrix may be called 1st, 2nd, 3rd, . . . , (m−1)th, and mth rows from the top in the figure in order to distinguish between the rows of the matrix. Similarly, in the data lines 14 and the pixel circuits 110, the columns of the matrix may be called 1st, 2nd, 3rd, . . . , (n−1)th, and nth columns from the left in the figure in order to distinguish between the columns of the matrix.

Under the control by the display control circuit 20, the scanning line driving circuit 130 selects the scanning lines 12 one by one, for example, in order of the first, second, third, . . . and mth rows, and sets a scanning signal to the selected scanning line 12 to the H level. The scanning line driving circuit 130 sets a scanning signal to the scanning lines 12 other than the selected scanning line 12 to a L level.

The data line driving circuit 140 latches a data signal for one row supplied from the circuit for corresponding color among the conversion circuits 22R, 22G, and 22B, and outputs the data signal to the pixel circuit 110 located on the scanning line 12 via the data line 14 during a period in which the scanning signal to the scanning lines 12 is at the H level.

Figure 6:
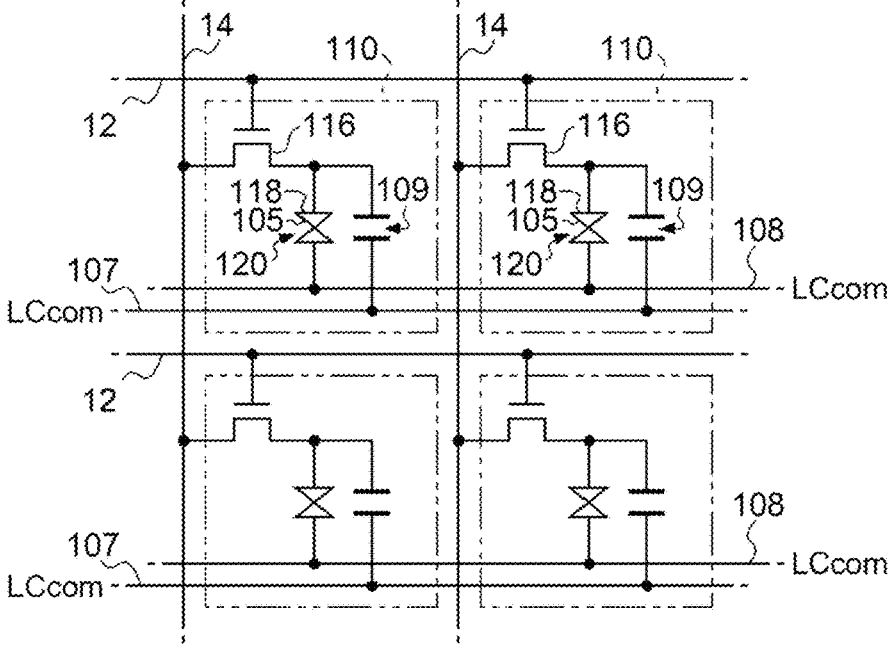
FIG. 6 is a diagram illustrating a configuration of a pixel circuit of the liquid crystal panel.

FIG. 6 is a diagram illustrating an equivalent circuit of a total of four of the pixel circuits 110, in two rows and two columns, corresponding to the intersections between two adjacent scanning lines 12 and two adjacent data lines 14.

As illustrated in the figure, the pixel circuit 110 includes a transistor 116 and a liquid crystal element 120. The transistor 116 is, for example, an n-channel thin film transistor. In the pixel circuit 110, the transistor 116 has a gate node coupled to the scanning line 12, a source node coupled to the data line 14, and a drain node coupled to the pixel electrode 118 having a square shape in plan view.

The common electrode 108 is provided in common to all the pixels to face the pixel electrode 118. A voltage LCcom is applied to the common electrode 108. As described above, the liquid crystal 105 is sandwiched between the pixel electrodes 118 and the common electrode 108. Therefore, the liquid crystal element 120 in which the liquid crystal 105 is sandwiched between the pixel electrodes 118 and the common electrode 108 is formed in each pixel circuit 110.

Further, a storage capacitor 109 is provided in parallel with the liquid crystal element 120. The storage capacitor 109 has one terminal coupled to the pixel electrode 118, and the other terminal coupled to a capacitance line 107. A voltage that is constant over time such as the voltage LCcom that is the same as the voltage applied to the common electrode 108 is applied to the capacitance line 107 for example. Since the pixel circuits 110 are arranged in a matrix in a horizontal direction, which is a direction in which the scanning lines 12 extend, and a vertical direction, which is a direction in which the data lines 14 extends, the pixel electrodes 118 included in the pixel circuits 110 are also arranged in the vertical and horizontal directions.

In the scanning line 12 on which the scanning signal has reached the H level, the transistor 116 of the pixel circuit 110 provided to correspond to the scanning line 12 enters an on state. When the transistor 116 is turned on, the data line 14 and the pixel electrode 118 are electrically coupled, and thus, the data signal supplied to the data line 14 reaches the pixel electrode 118 via the transistor 116 that has been turned on. When the scanning line 12 becomes at the L level, the transistor 116 enters an off state, but a voltage of the data signal that has reached the pixel electrode 118 is held by a capacitance of the liquid crystal element 120 and the storage capacitor 109.

As is well known, in the liquid crystal element 120, orientation of liquid crystal molecules changes depending on an electric field generated by the pixel electrode 118 and the common electrode 108. Therefore, the liquid crystal element 120 has a transmittance according to an effective value of an applied voltage.

A region of the liquid crystal element 120 that functions as a panel pixel, that is, a region of a transmittance according to the effective value of the voltage is a region where the pixel electrode 118 and the common electrode 108 overlap when the element substrate 100a and the counter substrate 100b are viewed in plan view. Since the pixel electrode 118 is square in plan view, a shape of the pixel in the liquid crystal panel 100 is also square.

Further, in the present embodiment, the liquid crystal 105 is assumed to be of a vertical alignment (VA) type, and to be in a normally black mode in which a transmittance is lowest when a voltage applied to the liquid crystal element 120 is zero, and increases as the applied voltage increases.

An operation of supplying a data signal to the pixel electrode 118 of the liquid crystal element 120 is executed in order of 1st, 2nd, 3rd, . . . , mth rows in each horizontal scanning period, in an effective vertical scanning period of the unit periods f1 to f4. Accordingly, a voltage corresponding to the data signal is held in each of the liquid crystal elements 120 of the pixel circuits 110 arranged in the m rows and the n columns, each liquid crystal element 120 has a desired transmittance, and a transmitted image of the corresponding color is generated by the liquid crystal elements 120 arranged in the m rows and the n columns.

Thus, the generation of a transmitted image is executed for each RGB, and a color image obtained by combining RGB is projected onto the screen Scr.

The data signals Vid_R, Vid_G, and Vid B output corresponding to a certain unit period correspond to RGB components of the video data corresponding to the unit period. To this end, a combined image of a color corresponding to the projection position is projected at the projection position in the unit period.

FIG. 7 is a diagram illustrating a relationship between a frame period and unit periods in the projection display device 1 according to an embodiment. As illustrated in the figure, in the present embodiment, one frame (1F) period is divided into four unit periods. In order to distinguish the four unit periods from each other, reference signs are assigned as f1, f2, f3, and f4 in a chronological order for convenience.

The one frame period is a period during which one frame of an image represented by the video data Vid_in from an upper device is supplied, and is 16.7 milliseconds, which is one cycle, when a frequency of the vertical synchronization signal included in the synchronization signal Sync is 60 Hz. In this case, the length of each of the unit periods is ¼ of the length of the one frame period, which is 4.17 milliseconds.

In the present embodiment, the projection position is changed for each of the unit periods f1 to f4, and the user visually recognizes an image in which the image resolution designated by the video data Vid_in is reduced to ¼ at each projection position. In other words, the user spuriously visually recognizes an image having resolutions four times higher than the resolution of the combined image obtained by the liquid crystal panels 100R, 100G, and 100B.

The unit period f1 is made up of an effective vertical scanning period f1*a* and a vertical flyback period f1*b*. Of these periods, the effective vertical scanning period f1*a* is a period in which the scanning lines 12 from the first row to the mth row are sequentially horizontally scanned, and the vertical flyback period f1*b* is a preparation period for shifting from the last mth row to the first row and is a period obtained by subtracting the effective vertical scanning period f1 from the unit period f1*a*.

Similarly, the unit period f2 is made up of an effective vertical scanning period f2*a* and a vertical flyback period f2*b*, the unit period f3 is made up of an effective vertical scanning period f3*a* and a vertical flyback period f3*b*, and the unit period f4 is made up of an effective vertical scanning period f4*a* and a vertical flyback period f4*b*.

FIG. 8 is a diagram illustrating a correspondence relationship between the video pixel and the panel pixel.

In the figure, the left column is a diagram illustrating a part extracted from the arrangement of the video pixels indicated by the video data Vid_in, and the right column is a diagram illustrating an extracted arrangement of the panel pixels corresponding to the arrangement of the video pixel of the left column.

Note that the video pixels in the left column and the panel pixels in the right column are given reference numerals to be distinguished from one another.

More specifically, a pixel denoted by a reference numeral of a video pixel the last two digits of which is the same as those of the reference numeral given to a panel pixel corresponds to the panel pixel. For example, video pixels A11, B11, C11 and D11 correspond to a panel pixel p11.

In addition, the first digits A, B, C, and D in the reference numerals of the video pixels mean that the corresponding panel pixels are respectively represented by the unit periods f1, f2, f3, and f4 respectively. For example, the image pixel D11 is represented by the panel pixel p11 in the unit period f4. In other words, the panel pixel p11 represents the video pixels A11, B11, C11 and D11 respectively in the unit periods f1, f2, f3, and f4 as indicated by arrows.

When the panel pixel "represents" a certain video pixel, this means that the liquid crystal element 120 of the panel pixel has a transmittance corresponding to the gradation level (video pixel data) of the video pixel.

FIG. 9 is a diagram illustrating a trajectory of the projection position shifted by the optical path shifting element 230 in the first embodiment. For convenience, a position Ps1*a* which is a projection position in the effective vertical scanning period f1*a* of the unit period f1 is used as a reference.

In the present embodiment, the projection position remains at the reference position Ps1*a* during the effective vertical scanning period f1*a*, starts shifting upward in response to the start of the vertical flyback period f1*b*, and reaches a position Ps1*b* that is separated from the position Ps1*a* by a single pixel as counted by the panel pixel. Thereafter, until the effective vertical scanning period f2*a* starts, the projection position is inverted downward from the position Ps1*b* and is shifted to a position Ps2*a* that is separated from the position Ps1*b* by 0.5 pixels as counted by the panel pixel.

The projection position remains at the position Ps2*a* during the effective vertical scanning period f2*a*, starts shifting rightward in response to the start of the vertical flyback period f2*b*, and reaches a position Ps2*b* that is separated from the position Ps2*a* by a single pixel as counted by the panel pixel. Thereafter, until the effective vertical scanning period f3*a* starts, the projection position is inverted leftward from the position Ps2*b* and is shifted to a position Ps3*a* that is separated from the position Ps2*b* by 0.5 pixels as counted by the panel pixel.

The projection position remains at the position Ps3*a* during the effective vertical scanning period f3*a*, starts shifting downward in response to the start of the vertical flyback period f3*b*, and reaches a position Ps3*b* that is separated from the position Ps3*a* by a single pixel as counted by the panel pixel. Thereafter, until the effective vertical scanning period f4*a* starts, the projection position is inverted upward from the position Ps3*b* and is shifted to a position Ps4*a* that is separated from the position Ps3*b* by 0.5 pixels as counted by the panel pixel.

The projection position remains at the position Ps4*a* during the effective vertical scanning period f4*a*, starts shifting leftward in response to the start of the vertical flyback period f4*b*, and reaches a position Ps4*b* that is separated from the position Ps4a by a single pixel as counted by the panel pixel. Thereafter, until the effective vertical scanning period f1a starts, the projection position is inverted rightward from the position Ps4b and returns to the position Ps1a that is separated from the position Ps4b by 0.5 pixels as counted by the panel pixel.

FIG. 10 is a diagram illustrating a trajectory of the projection position shifted by the optical path shifting element 230 in Comparative Example for the first embodiment. In Comparative Example, the projection position remains at the reference position Ps1a during the effective vertical scanning period f1a, and shifts to the position Ps2a until the start of the effective vertical scanning period f2a. The projection position remains at the position Ps2a during the effective vertical scanning period f2a, shifts to the position Ps3a until the start of the effective vertical scanning period f3a, moves in a similar way thereafter, and returns to the position Ps1a until the start of the effective vertical scanning period f1a.

That is, in Comparative Example, the projection position is shifted directly from the position Ps1a to the position Ps2a, for example, from the end of the effective vertical scanning period f1a to the start of the effective vertical scanning period f2a, meaning that no unnecessary passage through the position Ps1b or the like is involved.

In other words, the first embodiment in which the projection position passes through the position Ps2a from the position Ps1a until the start of the effective vertical scanning period f2a after the end of the effective vertical scanning period f1a, reaches the position Ps1b, and then returns the projection position to the position Ps2a, is an overshooting configuration as compared with Comparative Example.

The positions Ps1a, Ps2a, Ps3a, and Ps4a are the target projection positions in the effective vertical scanning periods f1a, f2a, f3a, and f4a, respectively.

Figure 11:
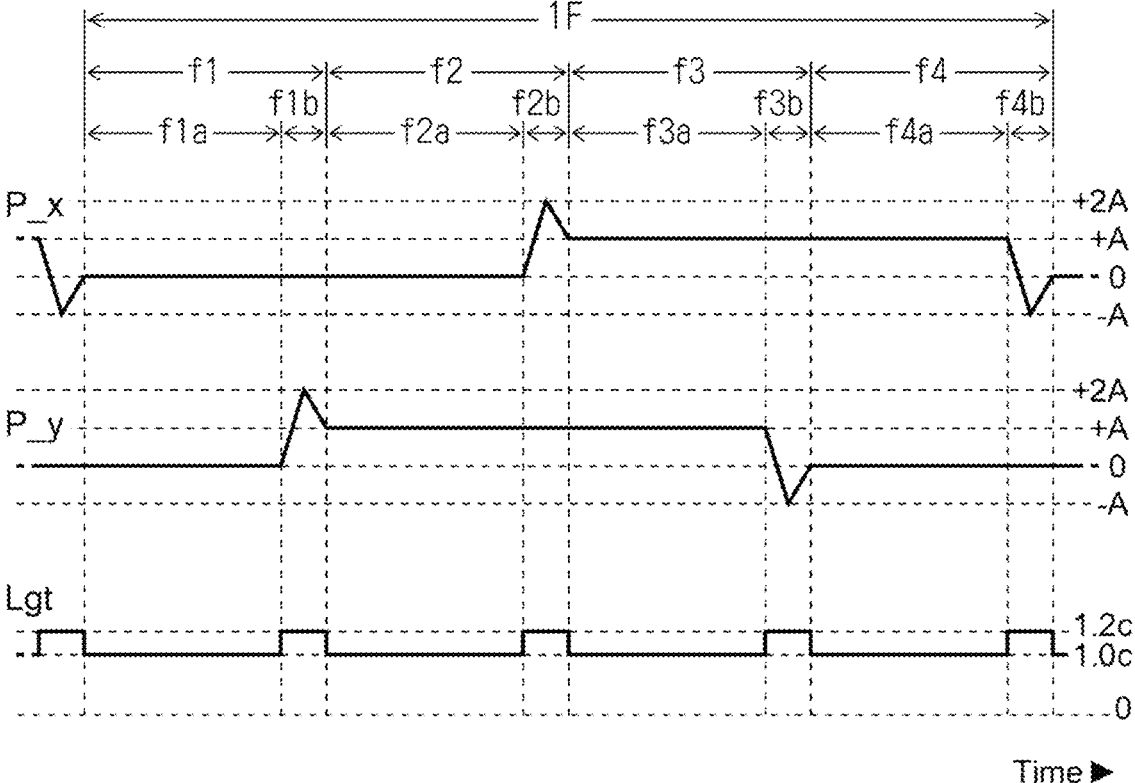
FIG. 11 is a diagram illustrating the contents of control on the optical path shifting element and a light source unit in one frame period.

FIG. 11 is a diagram illustrating an example of waveforms of the control signals P_x, P_y, and Lgt for achieving the trajectory of the projection position illustrated in FIG. 10.

The optical path shifting element 230 shifts the projection position in the left-right direction and/or in the up-down direction with respect to a projection surface. More specifically, the optical path shifting element 230 shifts the projection position rightward by a distance corresponding to the amount of increase in the level of the control signal P_x, and shifts the projection position leftward by a distance corresponding to the amount of decrease in the level of the control signal P_x. The optical path shifting element 230 shifts the projection position upward by a distance corresponding to the amount of increase in the level of the control signal P_y, and shifts the projection position downward by a distance corresponding to the amount of decrease in the level of the control signal P_y. When the levels of the control signals P_x and P_y are both 0, the optical path shifting element 230 determines that the projection position is at the reference position Ps1a, and when the levels of the control signals P_x and P_y are changed by A, the shifted distance of the projection position is 0.5 pixels as counted by the panel pixel.

Thus, for example, when the level of the control signal P_x is 0 and the level of the control signal P_y is +2A, the optical path shifting element 230 upwardly shifts the projection position to the position Ps1b separated from the reference position Ps1a by one pixel as counted by the panel pixel.

The light source unit 2102 sets the intensity of the emitted light to be relatively high when the level of the control signal Lgt is high, and to be relatively low when the level of the control signal Lgt is low. Specifically, when a state in which the level of the control signal Lgt is 1.0c is set as a reference state, the light source unit 2102 sets the intensity of the emitted light to be higher than the reference state when the level of the control signal Lgt is 1.2c.

Figure 12:
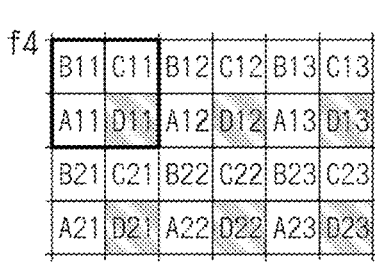
FIG. 12 is a diagram illustrating a relationship between a video pixel and a projection position of the panel pixel in one frame period in the projection display device.
Figure 12:
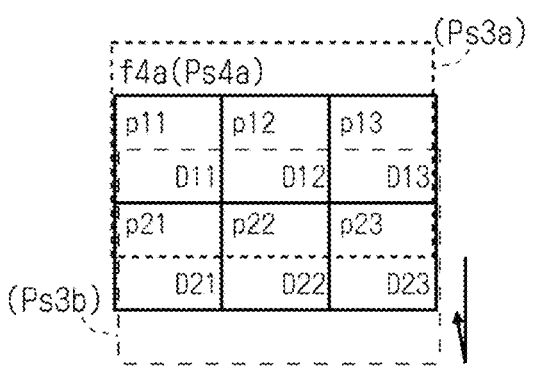

FIG. 12 is a diagram illustrating a relationship among the video pixel, the panel pixel, and the projection position in one frame period.

In the effective vertical scanning period f1a of the unit period f1, the projection position is the reference position Ps1a. Panel pixels p11, p12, p13, p21, p22, and p23 respectively represent hatched video pixels A11, A12, A13, A21, A22, and A23 at the position Ps1a. Thereafter, the projection position is shifted to the position Ps2a via the position Ps1b in the vertical flyback period f1b.

In the effective vertical scanning period f2a of the unit period f2, the panel pixels p11, p12, p13, p21, p22, and p23 respectively represent hatched video pixels B11, B12, B13, B21, B22, and B23 at the position Ps2a. Thereafter, the projection position is shifted to the position Ps3a via the position Ps2b in the vertical flyback period f2b.

In the effective vertical scanning period f3a of the unit period f3, the panel pixels p11, p12, p13, p21, p22, and p23 respectively represent hatched video pixels C11, C12, C13, C21, C22, and C23 at the position Ps3a. Thereafter, the projection position is shifted to the position Ps4a via the position Ps3b in the vertical flyback period f3b.

In the effective vertical scanning period f4a of the unit period f4, the panel pixels p11, p12, p13, p21, p22, and p23 respectively represent hatched video pixels D11, D12, D13, D21, D22, and D23 at the position Ps4a. Thereafter, the projection position returns to the position Ps1a via the position Ps4b in the vertical flyback period f4b.

In the liquid crystal panel 100, the transmittance of a panel pixel is defined by the magnitude of a voltage difference determined by the pixel electrode 118 and the common electrode 108, i.e., (the tilt angle of) the alignment of liquid crystal molecules according to the magnitude of an electric field in a direction perpendicular to the substrate surface (vertical electric field).

When a dark panel pixel having a low transmittance and a bright panel pixel having a high transmittance are adjacent to each other, a voltage difference between the pixel electrodes 118 is large, and an electric field (lateral electric field) in a direction along the substrate surface is generated in a region including a boundary between the two pixels in plan view.

For this reason, the alignment of the liquid crystal molecules, which should be determined only by the vertical electric field, is disturbed by the influence of the lateral electric field, resulting in an alignment defect, i.e., a so-called domain. In general, a larger voltage difference between the pixel electrodes 118, that is, a larger difference in gradation level leads to more severe alignment defect near the boundary between two adjacent panel pixels.

A region where the alignment of the liquid crystal molecules is disturbed has reduced transmittance in the normally black mode to be dark. Meanwhile, the dark panel pixel is in a dark state by default, meaning that deterioration of display quality due to the disturbance of the alignment of the liquid crystal molecules is difficult to visually recognize. In other words, the alignment defect caused by the bright panel pixel and the dark panel pixel being adjacent to each other occurs in both the dark panel pixel and the bright panel pixel across the boundary, but the deterioration of the display quality due to the alignment defect is visually recognized as a local deterioration of the transmittance in the bright panel pixel.

Such an alignment defect will be described using a specific example.

Figure 14:
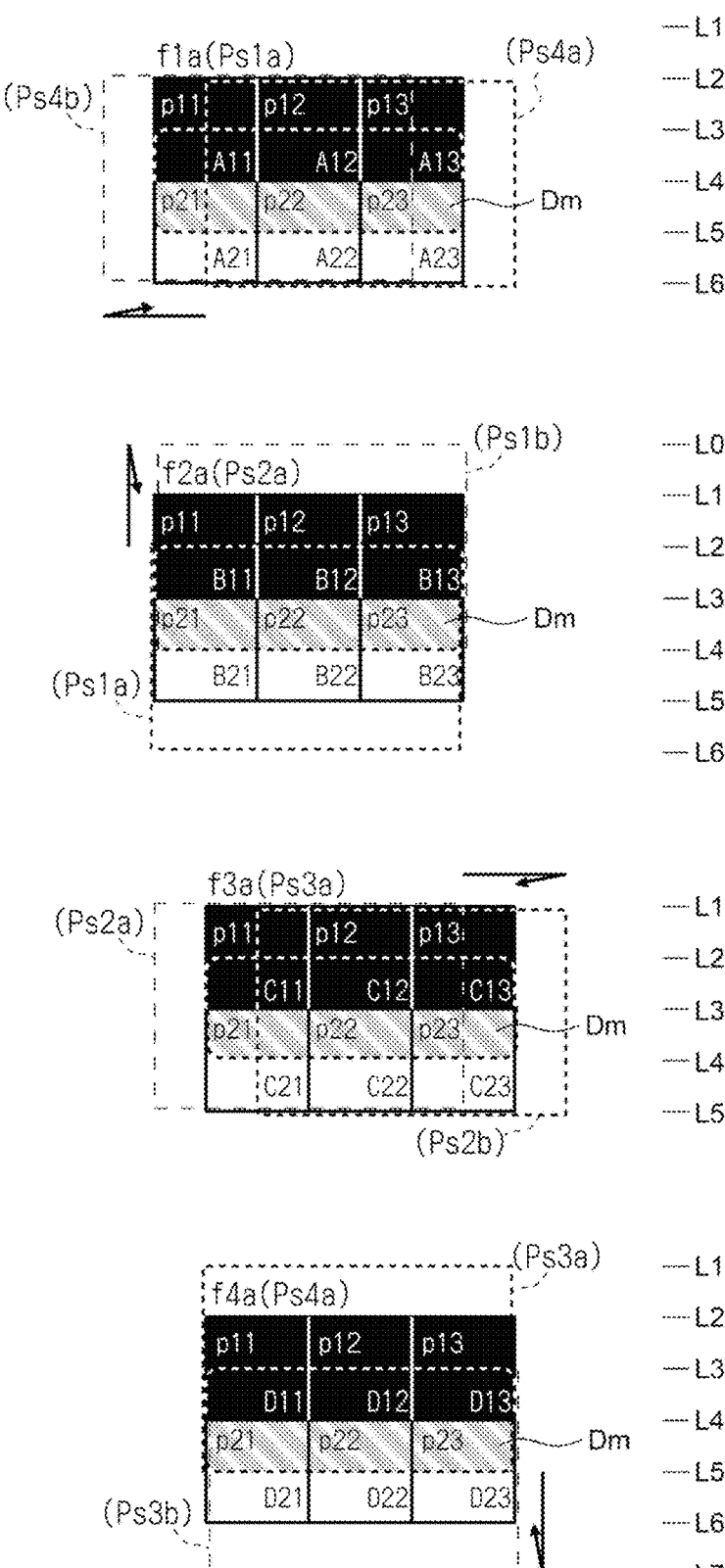
FIG. 14 is a diagram illustrating a domain occurring situation.

FIG. 13 is a diagram illustrating an example of an arrangement of video pixels in which an alignment defect is easily noticeable, and FIG. 14 is a diagram illustrating a relationship between panel pixels representing such video pixels and projection positions.

FIG. 13 illustrates an example of an arrangement in which a black video pixel with the lowest gradation level and a white video pixel with the highest gradation level are adjacent to each other. Specifically, in this example, a black region includes video pixels B11, C11, B12, C12, B13, C13, A11, D11, A12, D12, A13, and D13, and a white region includes video pixels B21, C21, B22, C22, B23, C23, A21, D21, A22, D22, A23, and D23.

In a case where the panel pixels represent such video pixels, as illustrated in FIG. 14, in each of the unit periods f1 to f4, the panel pixels p11, p12, and p13 are dark panel pixels and the panel pixels p21, p22, and p23 are bright pixels. Therefore, the alignment defect occurs in a region Dm across the boundary, that is, in both the dark panel pixel and the bright panel pixel.

However, the deterioration of the display quality due to the alignment defect is not noticeable in the dark panel pixels, but is visible in the bright panel pixels p21, p22, and p23 as indicated by hatching in the drawing.

The width of the hatched region, i.e., the length in the direction perpendicular to the direction of the boundary between the bright panel pixel and the dark panel pixel, which varies depending on the magnitude of the lateral electric field, the duration of the lateral electric field, and the like, is set to 0.5 pixels as counted by the panel pixel for convenience in the drawing.

In FIG. 14, L0 to L7 indicate the absolute coordinate system in the up-down direction when the projection position of the panel pixel is shifted by the optical path shifting element 230, and the interval is 0.5 pixels as counted by the panel pixel. For example, in a case of the reference position Ps1*a* in the effective vertical scanning period f1*a*, the upper sides of the panel pixels p11, p12, and p13 are located at the coordinate L2. Note that the absolute coordinate system is a coordinate system on the projection surface that is not related to the shifting of the projection position.

Figure 15:
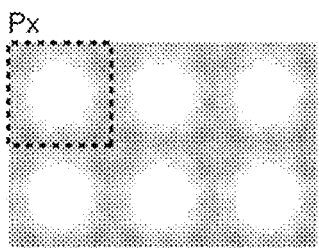
FIG. 15 is a diagram illustrating an example what is displayed by panel pixels actually visually recognized.
Figure 15:
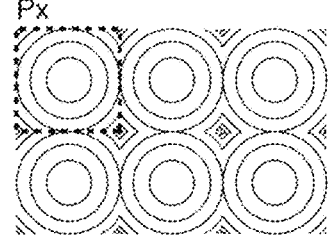

FIG. 15 is a diagram illustrating an actual display state in the panel pixel. It should be noted that this display state indicates a state in which a white video pixel with the highest gradation level is displayed. In this display state, the projection position is fixed for the sake of explanation.

A microlens is provided for each panel pixel in the liquid crystal panel 100 in order to increase light use efficiency, as described above. Therefore, brightness is not uniform among the panel pixels projected and actually becomes high in the vicinity of a center and decreases toward the outer side from the vicinity of the center, as illustrated in a left field of FIG. 15. A frame Px indicates an outer edge of the panel pixel in the liquid crystal panel 100.

In a right field of FIG. 14, for convenience of explanation, the brightness of the panel pixel in the white display state is represented by a linear density, and a state is illustrated where a higher linear density leads to a lower brightness.

Comparative Example is a configuration with no projection position overshoot. Therefore, in Comparative Example, as illustrated in FIG. 10, the projection position sequentially shifts to be at the position Ps1*a* in the unit period f1, the position Ps2*a* in the unit period f2, the position Ps3*a* in the unit period f3, and the position Ps4*a* in the unit period f4.

Here, in FIG. 14, in the region Dm in which the alignment defect occurs, the hatched region, that is, the region in which the display quality is compromised is located as follows. Specifically, the hatched region is located in the region of the coordinates L4 an L5 in the unit period f1, located in the region of the coordinates L3 and L4 in the unit period f2, located in the region of the coordinates L3 and L4 in the unit period f3, and located in the region of the coordinates L4 and L5 in the unit period f4. In other words, in the region of the coordinates L4 and L5, the display quality is compromised in two unit periods, and the region is a bright panel pixel in the remaining two unit periods. Therefore, the deterioration of the display quality is relatively easily visually recognized.

In the region of the coordinates L3 and L4, the display quality is compromised in two unit periods, but the region is a dark panel pixel in the remaining two unit periods. For this reason, even if the display quality deteriorates, the deterioration becomes less noticeable due to the dark panel pixels. Thus, the deterioration of display quality is relatively difficult to visually recognize.

Figure 16:
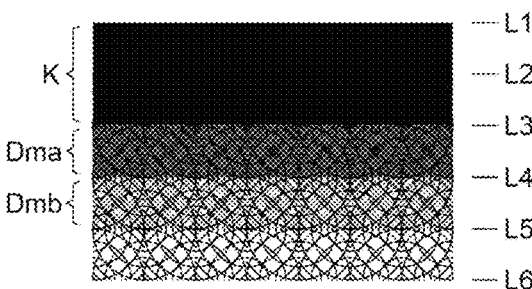
FIG. 16 is a diagram for explaining what is displayed and visually recognized according to Comparative Example.

This is illustrated in FIG. 16. Specifically, the region K is a region that is a dark panel pixel due to a black video pixel. A region Dma is a region in which the alignment defect occurs but the deterioration of the display quality due to the dark panel pixels is difficult to visually recognize. A region Dmb is a region in which deterioration of display quality due to occurrence of an alignment defect can be easily visually recognize.

In contrast to such Comparative Example, in the first embodiment, the projection positions in the effective vertical scanning periods f1*a*, f2*a*, f3*a*, and f4*a* are the same as those in Comparative Example, but the projection positions in the vertical flyback periods f1*b*, f2*b*, f3*b*, and f4*b* are shifted in an overshooting trajectory.

Therefore, in FIG. 14, in the region Dm in which the alignment defect occurs, the hatched region in which the display quality is deteriorated remains in the region of the coordinates L4 and L5 particularly in the effective vertical scanning period f1*a*, but is displaced upward in the drawing from the region of the coordinates L4 and L5 due to the overshooting trajectory in the vertical flyback period f1*b*. Therefore, since the period during which the hatched region remains in the region of the coordinates L4 and L5 becomes shorter than that in Comparative Example due to the overshooting, the hatched region is visually recognized to be bright as compared with Comparative Example.

Figure 17:
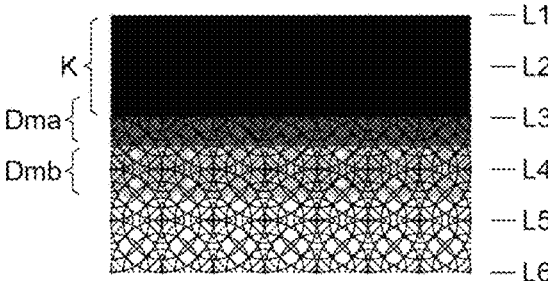
FIG. 17 is a diagram for explaining what is displayed and visually recognized according to the first embodiment.

This is illustrated in FIG. 17. Specifically, the region K is similar to that in Comparative Example, but the regions Dma and Dmb are displaced upward in the figure compared with those in Comparative Example.

In the first embodiment, the intensity of light emitted from the light source unit 2102 during the vertical flyback periods f1*b*, f2*b*, f3*b*, and f4*b* is higher than the intensity of light emitted during the effective vertical scanning periods f1*a*, f2*a*, f3*a*, and f4*a*. For this reason, since the brightness is increased so as to compensate for darkening of the display due to the alignment defect, it is possible to make the deterioration of the display quality less noticeable.

In this example, a description is given on an example where black video pixels are arranged on the upper side and white video pixels are arranged on the lower side. Also in an opposite arrangement, that is, when the black video pixels are arranged on the lower side and the white video pixels are arranged on the upper side, with the overshooting in the vertical flyback period f3b, it is possible to suppress the deterioration of the display quality due to the alignment defect.

Also in an example where the black video pixels are arranged on the right side and the white video pixels are arranged on the left side, with the overshooting in the vertical flyback period f2b, it is possible to suppress the deterioration of the display quality as due to the alignment defect. Also in an opposite arrangement, that is, when the black video pixels are arranged on the left side and the white video pixels are arranged on the right side, with the overshooting in the vertical flyback period f4b, it is possible to suppress the deterioration of the display quality due to the alignment defect.

In the first embodiment, for example, the position Ps1b has the longest distance from the position Ps1a when shifting from the projection position Ps1a in the effective vertical scanning period f1a of the unit period f1 to the projection position Ps2a in the effective vertical scanning period f2a of the next unit period f2 occurs. This maximum distance is one pixel as counted by the panel pixel. The maximum distance is not limited to this, and may be longer than one pixel as counted by the panel pixels.

In the first embodiment, the direction of the projection position overshoot is, for example, only the upward direction beyond the position Ps2a when shifting from the reference position Ps1a to the position Ps2a occurs, but this should not be construed in a limiting sense. A second embodiment and a third embodiment with different overshooting trajectories of the projection position will be described.

Figure 18:
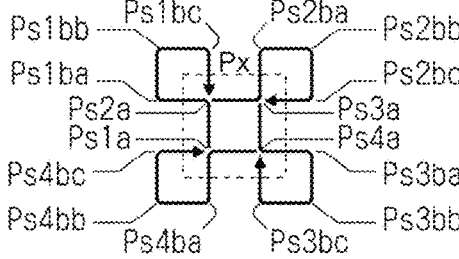
FIG. 18 is a diagram illustrating a trajectory of a projection position obtained by an optical path shifting element according to a second embodiment.

FIG. 18 is a diagram illustrating a trajectory of the projection position of the second embodiment.

In the second embodiment, the projection position remains at the reference position Ps1a during the effective vertical scanning period f1a, starts shifting upward in response to the start of the vertical flyback period f1b, and returns to the position Ps2a via positions Ps2a, Ps1ba, Ps1bb, and Ps1bc until the effective vertical scanning period f2a starts. More specifically, the projection position starts shifting upward when the vertical flyback period f1b starts, turns leftward at the position Ps2a, turns upward at the position Ps1ba, turns rightward at the position Ps1bb, turns downward at the position Ps1bc, and returns to the position Ps2a.

Each of the distance from the position Ps2a to the position Ps1ba, the distance from the position Ps1ba to the position Ps1bb, the distance from the position Ps1bb to the position Ps1bc, and the distance from the position Ps1bc to the position Ps2a is, for example, 0.5 pixels as counted by the panel pixel.

Then, similarly, the projection position remains at the reference position Ps2a during the effective vertical scanning period f2a, starts shifting rightward in response to the start of the vertical flyback period f2b, and returns to the position Ps3a via positions Ps3a, Ps2ba, Ps2bb, and Ps2bc until the effective vertical scanning period f3a starts.

The projection position remains at the reference position Ps3a during the effective vertical scanning period f3a, starts shifting upward in response to the start of the vertical flyback period f3b, and returns to the position Ps4a via positions Ps4a, Ps3ba, Ps3bb, and Ps3bc until the effective vertical scanning period f4a starts.

The projection position remains at the reference position Ps4a during the effective vertical scanning period f4a, starts shifting leftward in response to the start of the vertical flyback period f4b, and returns to the position Ps1a via positions Ps1a, Ps4ba, Ps4bb, and Ps4bc until the effective vertical scanning period f1a starts.

The first embodiment is a configuration in which the deterioration of display quality due to alignment defect occurring when the black video pixels are arranged on the upper side and the white video pixels are arranged on the lower side is suppressed by the overshooting in the upward direction in the vertical flyback period f1b.

On the other hand, in the second embodiment, the deterioration of the display quality due to the alignment defect occurring when the black video pixels are video pixels are arranged on the lower side is suppressed by the upward overshooting in the vertical flyback periods f1b, f2b, f3b, and f4b.

The deterioration of the display quality due to the alignment defect occurring with the opposite arrangement, that is, when the black video pixels are arranged on the lower side and the white video pixels are arranged on the upper side is suppressed by the downward overshooting in the vertical flyback periods f1b, f2b, f3b, and f4b.

The deterioration of the display quality due to the alignment defect occurring when the black video pixels are arranged on the right side and the white video pixels are arranged on the left side is suppressed by the rightward overshooting in the vertical flyback periods f1b, f2b, f3b, and f4b.

The deterioration of the display quality due to the alignment defect occurring with the opposite arrangement, that is, when the black video pixels are arranged on the left side and the white video pixels are arranged on the right side is suppressed by the leftward overshooting in the vertical flyback periods f1b, f2b, f3b, and f4b.

As described above, in the second embodiment, the deterioration of the display quality in the case where the black video pixels and the white video pixels are arranged vertically or horizontally is suppressed by each of the vertical flyback periods f1b, f2b, f3b, and f4b. Thus, in the second embodiment, the deterioration of the display quality can be suppressed compared with the first embodiment.

In the second embodiment, the overshooting trajectories are all clockwise with respect to the positions Ps1a, Ps2a, Ps3a, and Ps4a, but may be counterclockwise. When the overshooting trajectory is counterclockwise, for example, in a case of overshooting in the vertical flyback period f1b, the projection position starts to shift upward from the position Ps1a when the vertical flyback period f1b starts, passes through the positions Ps2a, Ps3a, Ps2ba, and Ps1bc, and returns to the position Ps2a until the start of the effective vertical scanning period f2a.

Figure 19:
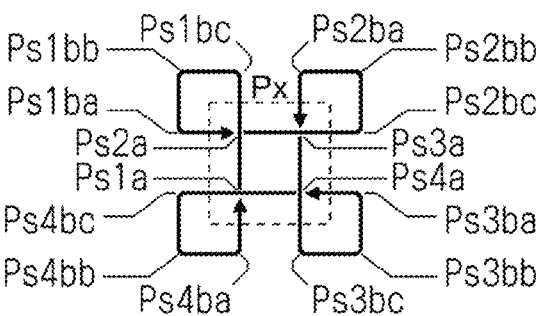
FIG. 19 is a diagram illustrating a trajectory of a projection position obtained by an optical path shifting element according to a third embodiment.

FIG. 19 is a diagram illustrating a trajectory of the projection position of the third embodiment.

In the third embodiment, the projection position remains at the position Ps1a during the effective vertical scanning period f1a, starts shifting upward in response to the start of the vertical flyback period f1b, and returns to the position Ps2a via the positions Ps1bc, Ps1bb, and Ps1ba after passing through the position Ps2a, until the effective vertical scanning period f2a starts. More specifically, the projection position starts shifting upward when the vertical flyback period f1b starts, shifts straight at the position Ps2a without turning, turns leftward at the position Ps1bc, turns downward at the position Ps1bb, turns rightward at the position Ps1ba, and returns to the position Ps2a.

Thus, the third embodiment is a configuration in which the overshooting occurs in such a manner that the projection position passes through the position in the effective vertical scanning period of the next unit period, and then returns to the position in the effective vertical scanning period of the next unit period by moving in the direction opposite to that in the second embodiment.

Thus, in the third embodiment, the deterioration of the display quality can be suppressed compared with the first embodiment, as in the second embodiment.

In addition, in the third embodiment, unlike in the second embodiment, the overshooting occurs in such a manner that the projection position does not turn but moves straight at the positions Ps1a, Ps2a, Ps3a, and Ps4a. In other words, in the third embodiment, since the number of turns of the projection position is smaller than that in the second embodiment, a high-speed response is not required for the optical path shifting element 230, and thus cost reduction can be expected.

In the third embodiment, the overshooting trajectories are all counterclockwise with respect to the positions Ps1a, Ps2a, Ps3a, and Ps4a, but may be clockwise. When the overshooting trajectory is counterclockwise, for example, in a case of overshooting in the vertical flyback period f1b, the projection position starts to shift upward from the position Ps1a when the vertical flyback period f1b starts, passes through the positions Ps2a, and returns to the position Ps2a via the positions Ps1bc, Position Ps2ba, and Ps3a until the start of the effective vertical scanning period f2a.

In the first to third embodiments described above (hereinafter referred to as an "embodiment and the like"), various modifications or applications are possible as follows.

In the embodiment and the like, the liquid crystal panel 100 is of the transmissive type, but the liquid crystal panel 100 may also be of a reflective type.

In the embodiment or the like, one frame period is divided into four unit periods. That is, in the description, "4" is k, which is the number of unit periods included in one frame period.

Not that k is not limited to "4". Specifically, one frame period may include "2" unit periods, or may include "3" or "5" or more unit periods.

In the embodiments and the like, the period during which overshooting of the trajectory of the projection position is caused by the optical path shifting element 230 is not limited to the vertical flyback period. For example, the period in which the overshooting of the trajectory of the projection position occurs may start in the middle of the effective vertical scanning period and may reach part of the end point of the effective vertical scanning period, or may end in the middle of the effective vertical scanning period and may reach part of the starting point of the effective vertical scanning period.

It is preferable that the period during which the amount of light emitted from the light source unit 2102 is made larger than the standard amount of light matches the period during which the projection position overshooting occurs.

From the embodiments illustrated above, the following aspects can be ascertained, for example.

A projection display device according to an aspect includes: a liquid crystal panel including a panel pixel; an optical path shifting element configured to shift a projection position of a projected pixel projected from the panel pixel for each of k unit periods from a first unit period to a kth unit period included in one frame period, k being an integer that is equal to or larger than two; and a display control circuit configured to control the liquid crystal panel and the optical path shifting element, wherein the display control circuit supplies a data signal corresponding to a gradation level designated by video pixel data forming video data, to the panel pixel in each of the unit periods, and controls, by the optical path shifting element, the projection position for each of the unit periods, and the optical path shifting element shifts, for each of the unit periods, the projection light to a target projection position which is a target, after the light passes through the target projection position.

According to the projection display device of the first aspect, deterioration of display quality due to the alignment defect is less noticeable.

In a projection display device according to a specific second aspect of the first aspect, shifting from an immediately preceding target projection position in a unit period before one unit period to one target projection position in the one unit period occurs with a maximum separation distance from the immediately preceding target projection position being one or more pixels, the pixels being the panel pixels.

In a projection display device according to a specific third aspect of the second aspect, the optical path shifting element shifts the projection position from the immediately preceding target projection position to an opposite position with respect to the one target projection position, and then returns the projection position to the one target projection position.

In a projection display device according to a specific fourth aspect of the first aspect, the optical path shifting element causes the projection position to shift from the immediately preceding target projection position and turn at the one target projection position and then return, in a clockwise or counterclockwise direction as viewed on the projection surface, to the one target projection position.

In a projection display device according to a specific fifth aspect of the first aspect, the optical path shifting element causes the projection position to move straight from the immediately preceding target projection position to the one target projection position and then return, in a clockwise or counterclockwise direction as viewed on the projection surface, to the one target projection position.

What is claimed is:

1. A projection display device comprising:

a liquid crystal panel including a panel pixel;

an optical path shifting element configured to shift an optical path of projection light projected from the panel pixel to cause a position of a projected pixel displayed by the projection light to be different for each of k unit periods from a first unit period to a kth unit period included in one frame period, k being an integer that is equal to or larger than two; and a display control circuit configured to control the liquid crystal panel and the optical path shifting element, wherein the display control circuit supplies a data signal corresponding to a gradation level designated by video pixel data forming video data, to the panel pixel in each of the unit periods, and controls, by the optical path shifting element, the projection position for each of the unit periods, the optical path shifting element shifts, for each of the unit periods, the projection light to a target projection position which is a target, by first shifting the projection light to the target projection position, then passing the projection light through the target projection position and shifting the projection light away from the target projection position, and returning the projection light to the target projection position after the projection light has passed through the target projection position, and in one of the unit periods, the optical path shifting element shifts the projection light to the target projection position along a first direction and, after the projection light has reached the target projection position, passed through the target projection position and shifted away from the target projection position along the first direction, shifts the projection light back to the target projection position along a second direction that is opposite to the first direction.

2. The projection display device according to claim 1, wherein shifting from an immediately preceding target projection position in a unit period before one unit period to one target projection position in the one unit period occurs with a maximum separation distance from the immediately preceding target projection position being one or more pixels, the pixels being the panel pixels.

3. The projection display device according to claim 2, wherein the optical path shifting element shifts the projection position from the immediately preceding target projection position to an opposite position with respect to the one target projection position, and then returns the projection position to the one target projection position.

4. The projection display device according to claim 1, wherein the optical path shifting element causes the projection position to shift from an immediately preceding target projection position and turn at the one target projection position and then return, in a clockwise or counterclockwise direction as viewed on the projection surface, to the one target projection position.

5. The projection display device according to claim 1, wherein the optical path shifting element causes the projection position to move straight from an immediately preceding target projection position to the one target projection position and then return, in a clockwise or counterclockwise direction as viewed on the projection surface, to the one target projection position.

* * * * *